(12) United States Patent
Wu et al.

(10) Patent No.: US 8,721,240 B1
(45) Date of Patent: May 13, 2014

(54) CARGO BRACING DEVICE

(71) Applicant: Lien Yang Industrial Co., Ltd., Tainan (TW)

(72) Inventors: Chun-Wei Wu, Tainan (TW); Chun-Yang Wu, Tainan (TW); Zheng-Hua Wu, Tainan (TW)

(73) Assignee: Lien Yang Industrial Co., Ltd., Tainan (TW)

( * ) Notice: Subject to any disclaimer, the term of this patent is extended or adjusted under 35 U.S.C. 154(b) by 0 days.

(21) Appl. No.: 13/854,021

(22) Filed: Mar. 29, 2013

(51) Int. Cl.
*B60P 7/08* (2006.01)

(52) U.S. Cl.
USPC .......................................................... 410/121

(58) Field of Classification Search
CPC .......... B60P 3/079; B60P 7/08; B60P 7/0823; B60P 7/0838; B60P 7/0846; B60P 7/0853; B60P 7/135; B65B 13/025; A44B 11/065
USPC .............. 410/12, 100, 103, 97, 121; 254/218, 254/223, 238; 24/68 CD, 69 CT, 69 ST, 24/70 ST, 71 ST
See application file for complete search history.

(56) References Cited

U.S. PATENT DOCUMENTS

| | | | |
|---|---|---|---|
| 5,494,387 A * | 2/1996 | Ruegg | 410/103 |
| 7,350,768 B1 | 4/2008 | Chang | 254/218 |

* cited by examiner

*Primary Examiner* — Stephen Gordon
(74) *Attorney, Agent, or Firm* — J.C. Patents

(57) ABSTRACT

A cargo bracing device includes a fixing member and a driving member. Mainly the fixing member possesses a connecting plate easily fitted with one end of an elastic device, and a locking plate easily fitted with another end of the elastic device. So the locking plate can be restored with dynamic force provided by the elastic device deposited between the connecting plate and the locking plate. The driving member includes two wings respectively having one end formed as a hook collaborating with a latch of a driven plate to enable the driving member combined with or detached from the fixing member. Similar to the fixing member, an elastic device is easily installed between an actuating plate and a connecting bar of the driving member, providing dynamic force for restoring the actuating plate. Therefore the cargo bracing device can be easily assembled, even with automatic equipments.

9 Claims, 5 Drawing Sheets

CARGO BRACING DEVICE

BACKGROUND OF THE INVENTION

1. Field of the Invention

This invention relates to a cargo bracing device, particularly to one taking advantage of an actuating plate to command a driven plate to make a driving member combined with or detached from a fixing member, advancing cargo-fastening security. With the driving member separable from the fixing member, any unauthorized person cannot alter the condition of the fixing member bracing a rope without the driving member, able to boost delivery security of cargoes. Moreover, with structure of the cargo bracing device simplified, it can be manufactured by automatic equipment to improve quality and productivity.

2. Description of the Prior Art

Commonly, a conventional cargo bracing device, as disclosed in U.S. Pat. No. 7,350,768B1 (Taiwan Patent No. M319128), was designed to enable a tightening base 10 to be assembled with or detached from a grip 50. The main mechanism is to provide a main groove 54 symmetrically cut in two wings 52 respectively for a control plate 55 to horizontally fit in. Two spring recesses 56 are cut in each main groove 54 spaced with proper intervals. A fitting bar 57 is jointed with the wings 52, located between the spring recesses 56 for being fitted by two torsion springs 58, with a first foot 581 of the torsion springs 58 resting on a sidewall of the spring recesses 56, and a second foot 582 of the torsion springs 58 respectively locked in two locking holes 551 of the control plate 55. So the second foot 582 of the torsion springs 58 can elastically push the control plate 55 to engage with two ratchets 30, which can be driven by the grip 50 to rotate in one direction. Moreover, the control plate 55 is riveted with two blocking plates 59 used to open or close a notch 531 of two C-shaped grooves 53 respectively while it is detached from or assembled with the ratchets 30.

However, the conventional cargo bracing device has following defects. First, before the control plate 55 is riveted with the blocking plates 59, it has to be extended outward from the main groove 54 of the wings 52, yet difficult to be done owing to structural limitation of the cargo bracing device. That is, there is no sufficient room for riveting work, practically posing trouble to manufacturing.

Second, with the control plate 55 engaged with the ratchets 30 as described previously, the torsion springs 58 may confront difficulty in assembly after being fitted on the fitting bar 57, as counterforce retards positioning the first foot 581 and the second foot 582 in a rather small space, slowing down speed of manufacturing and impossible to be done by automatic equipment.

Third, two sidewalls 12 of the tightening base 10 are respectively bored with a guiding groove 41 fitted with a guiding plate 42 sliding therein. Two spring recesses 43 are cut in each guiding groove 41 spaced with proper intervals. A fitting bar 44 is jointed with the sidewalls 12, located between the spring recesses 43 for being fitted by two torsion springs 45, with a first foot 451 of the torsion springs 45 resting on a sidewall of the spring recesses 43, and a second foot 452 of the torsion springs 45 respectively locked in two locking holes 421 of the guiding plate 42. So the second foot 452 of the torsion springs 45 can elastically push the guiding plate 42 to engage with the ratchets 30, which can be driven by the grip 50 to rotate in one direction for a positioning purpose. And as described previously, the torsion springs 45 may also confront difficulty in assembly after being fitted on the fitting bar 44, as counterforce retards positioning the first foot 451 and the second foot 452 in a rather small space, slowing down speed of manufacturing and impossible to be done by automatic equipments.

SUMMARY OF THE INVENTION

The object of this invention is to offer a cargo bracing device possible to be manufactured by automatic equipment, with structure simplified to step up manufacturing efficiency.

The main characteristics of the invention are a fixing member and a driving member.

The fixing member is provided with two side plates integrally made with a connecting plate provided with an elastic device base for being fitted with one end of an elastic device, and a locking plate possessing an elastic device base to engage with another end of the elastic device. So the locking plate can be restored with dynamic force provided by the elastic device locked between the elastic device bases of the connecting plate and the locking plate, simplifying assembly and saving cost of the locking plate.

The driving member is provided with two wings respectively cut with a sloped lengthy hole, and an actuating plate having two ends respectively formed with an extension orderly inserted through the sloped lengthy hole and a curved lengthy hole of a driven plate. Each of the wings is provided with a hook located at one end collaborating with a latch of the driven plate to grasp two ends of a winding shaft respectively. Therefore the driven member can be combined with or detached from the fixing member by operating the driven plates.

The driving member is also provided with an elastic device with one end fitted on an elastic device base of the actuating plate and another end hooked on a connecting bar jointed between the wings, so as to provide dynamic force for restoring the actuating plate.

BRIEF DESCRIPTION OF DRAWINGS

This invention is better understood by referring to the accompanying drawings, wherein.

DETAILED DESCRIPTION OF THE PREFERRED EMBODIMENT

Figure 1:
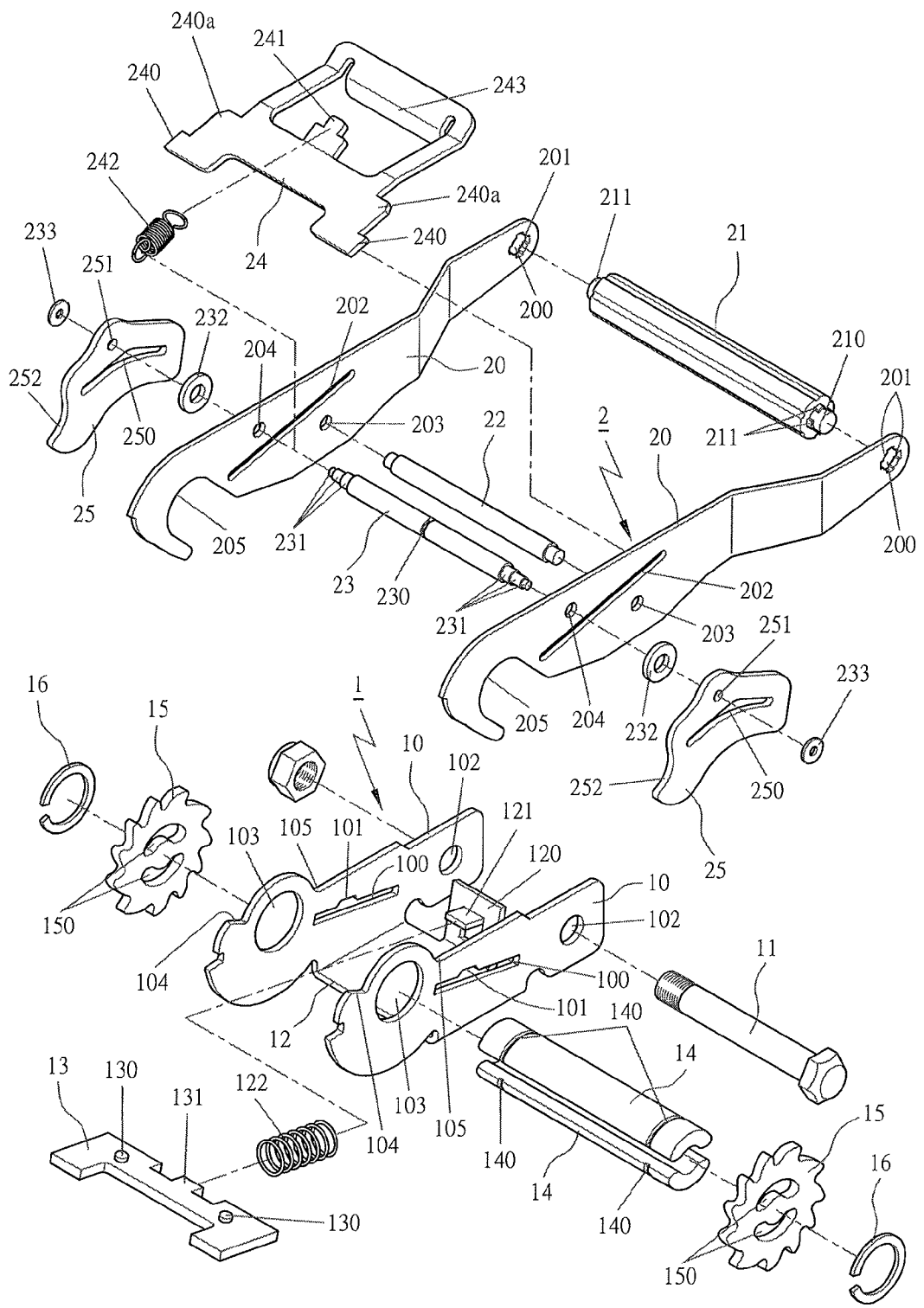
FIG. 1 is an exploded perspective view of a preferred embodiment of a cargo bracing device in the present invention.

As shown in FIG. 1, a preferred embodiment of a cargo bracing device in the present invention is composed of a fixing member 1 and a driving member 2.

Figure 6:
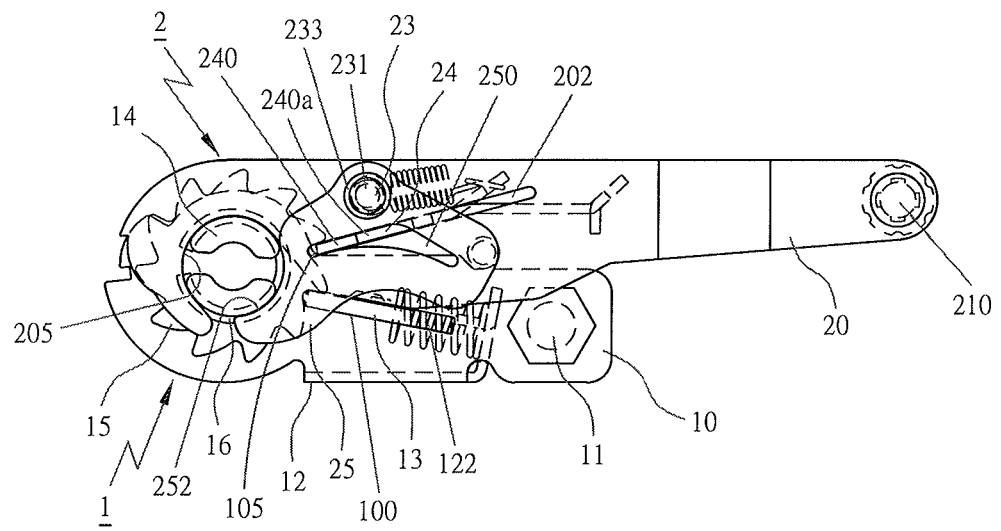
FIG. 6 is a side view of the preferred embodiment of a cargo bracing device in the present invention, showing the driving member being combined and folded with the fixing member.
Figure 9:
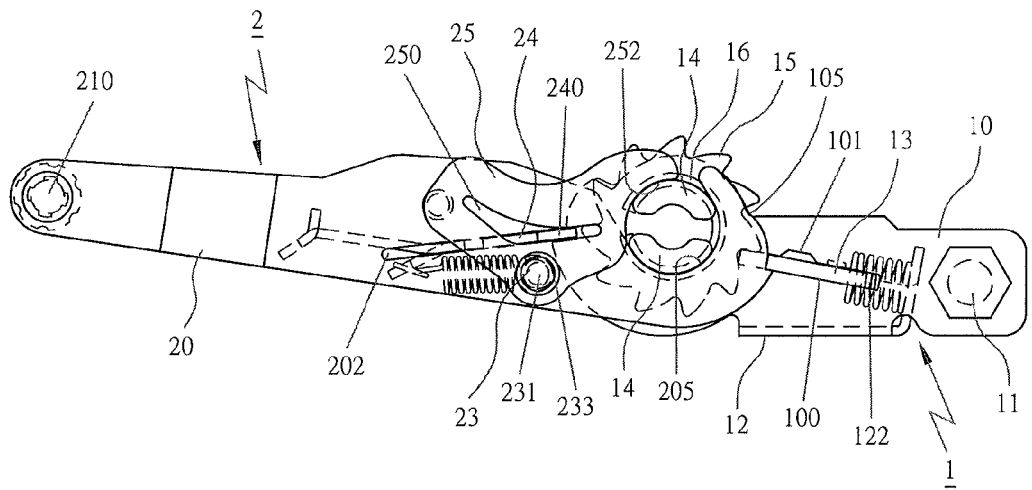
FIG. 9 is a side view of the preferred embodiment of a cargo bracing device in the present invention, showing a third state of collaboration between the driving member and the fixing member.

The fixing member 1 is provided with two side plates 10 respectively bored with a lengthy hole 100 having a projected groove 101 cut in the upper edge. The side plate 10 is provided with a hole 102 bored in one end for being inserted by a bolt 11 to connect and strengthen the side plates 10, and a winding shaft hole 103 bored in another end for a winding shaft 14 to pass through. The side plate 10 is as well provided with two blocking portions 104 and 105 located outwardly at two sides of the circumference of the winding shaft hole 103, restricting the winding shaft 14 driven by the driving member 2 to work between a maximum and a minimum range, as shown in FIGS. 9 and 6. The side plates 10 are integrally made with a connecting plate 12 having an upward curved end 120 provided with an elastic device base 121 for being fitted with one end of an elastic device 122, simplifying assembly of the elastic device 122.

Figure 2:
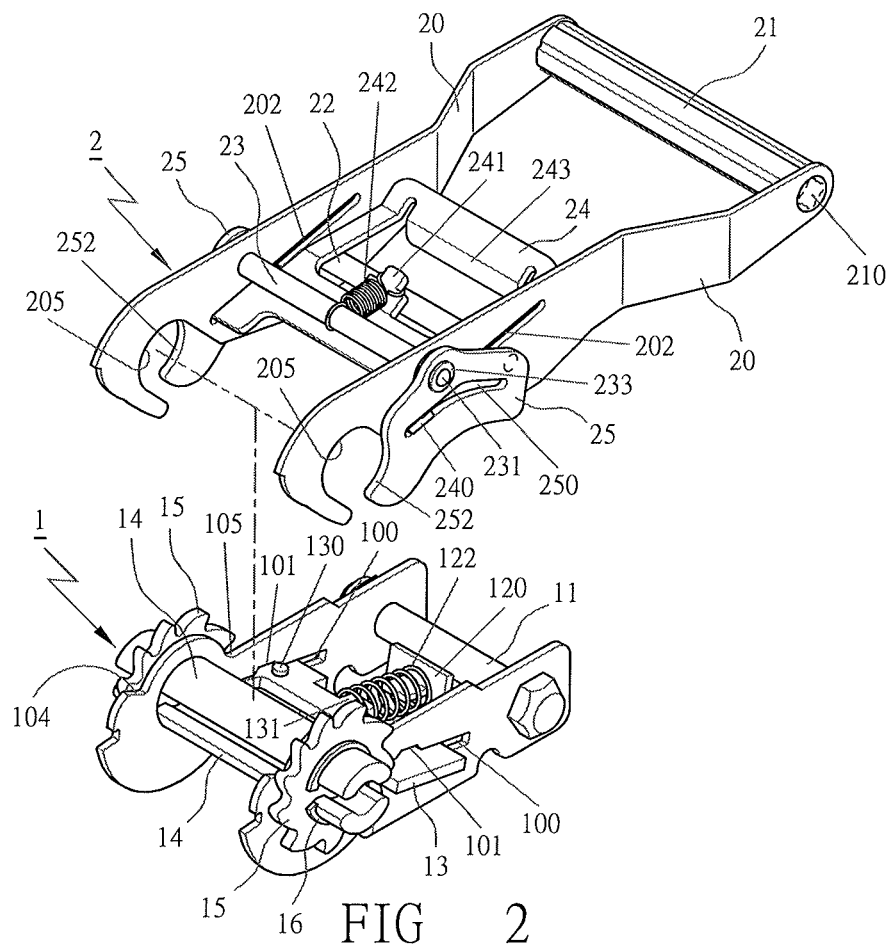
FIG. 2 is a partial exploded perspective view of the preferred embodiment of a cargo bracing device in the present invention.

As shown in FIGS. 1 and 2, a locking plate 13 has two ends fitted in the lengthy holes 100 of the side plates 10 respectively, provided with two blocking projections 130 built on one surface. When the locking plate 13 is to be combined with the side plates 10, it is first inserted from the outside of the lengthy hole 100 of one of the side plates 10 to extend out of the lengthy hole 100 of another side plate 10, with the blocking projections 130 corresponding to the projected grooves 101. Next the locking plate 13 is adjusted to remove the blocking projections 130 off the projected grooves 101, thus locked in the lengthy holes 100 of the side plates 10. The locking plate 13 is further provided with an elastic device base 131 formed at one edge to engage with another end of the elastic device 122. With the elastic device 122 restrictively deposited between the elastic device bases 121 and 131 of the connecting plate 12 and the locking plate 13; it can provide dynamic force for restoring the locking plate 13.

Figure 3:
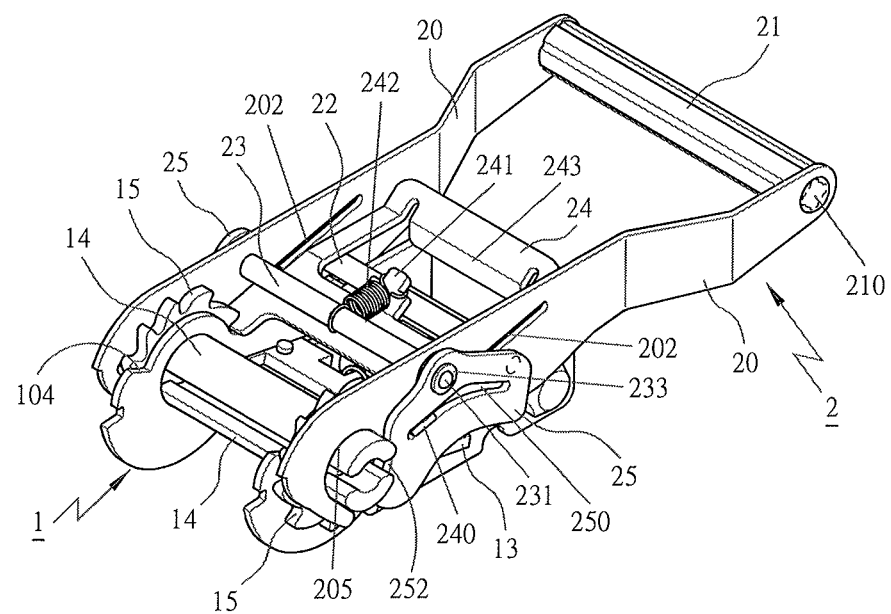
FIG. 3 is a perspective view of the preferred embodiment of a cargo bracing device in the present invention.

As shown in FIGS. 1~3, the winding shaft 14 is composed of two semi-annular steels fitted in the winding holes 103 of the side plates 10, with two ends respectively cut with a C-shaped fixing groove 140. A ratchet 15 is fitted on two sides of the winding shaft 14 respectively after having the winding shaft 14 fitted in the winding shaft holes 103. The ratchet 15 is bored with two semi-annular holes 150 for being correspondingly inserted by the semi-annular steels of the winding shaft 14. A C-shaped fixer 16 is successively locked in the C-shaped groove 140 of the winding shaft 14, so the winding shaft 14 can be fixedly positioned in the winding shaft holes 103 of the side plates 10, enabling the ratchets 15 to actuate the winding shaft 14 rotating in one direction.

Figure 4:
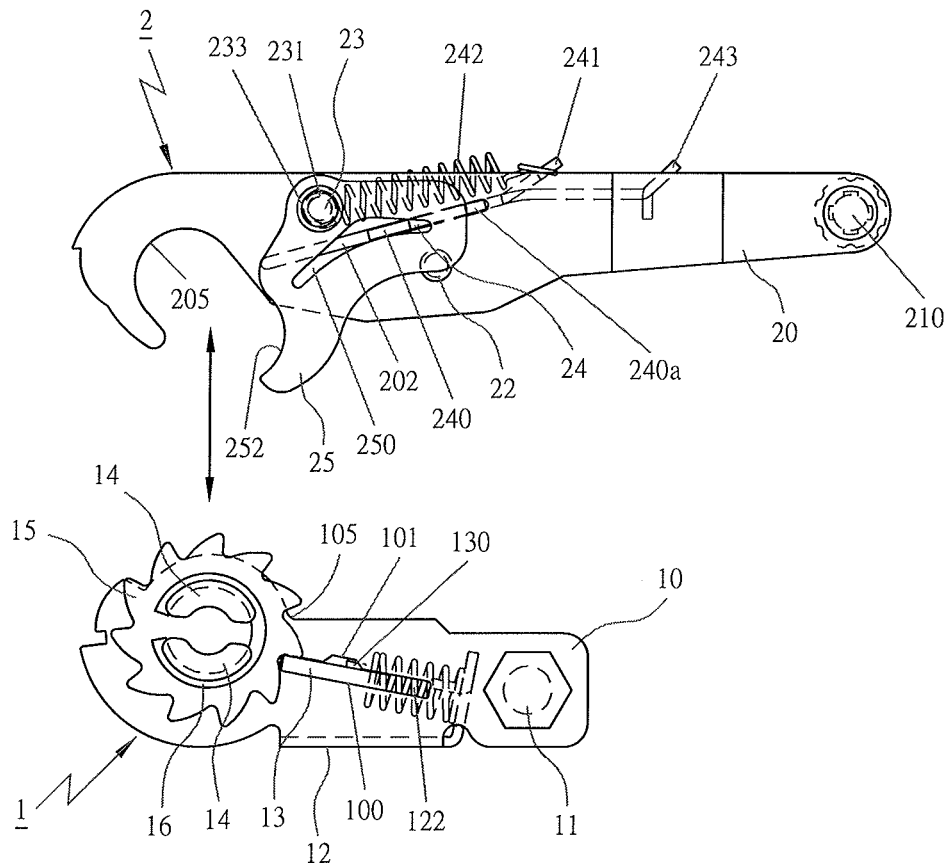
FIG. 4 is a side view of the preferred embodiment of a cargo bracing device in the present invention, showing how a driving member is combined with or detached from a fixing member.
Figure 5:
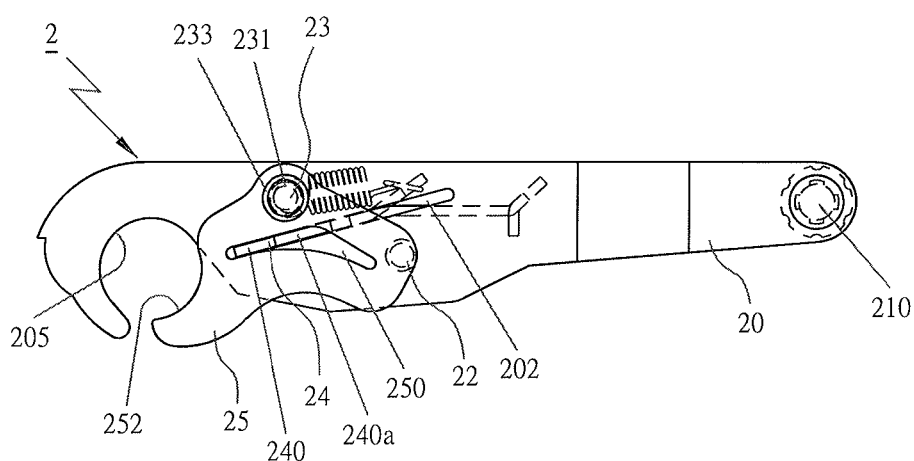
FIG. 5 is a side view of the driving member in the present invention.

The driving member 2 is provided with two wings 20 shaped with a definite curve. Each of the wings 20 is provided with a grip bar hole 200 bored in one end, with a plurality of projections 201 spotted on the circumference of the grip bar hole 200 for being riveted with two ends of a grip bar 21 respectively, as shown in FIGS. 4 and 5. Further, each of the wings 20 is provided with a sloped lengthy hole 202 for fitting two extensions 240 of an actuating plate 24 respectively, two connecting bar holes 203 and 204 used to be riveted with two connecting bars 22 and 23 (first and second), and a hook 205 formed with a particular curve at another end to work with the winding shaft 14, with an opening larger than outer diameter of the winding shaft 14.

As shown in FIGS. 1~3, the grip bar 21 is further provided with a shrunk portion 210 formed at two ends respectively, with plural projections 211 located around the circumference of the shrunk portion 210 to alternately interlock with the projections 201 of the grip bar hole 200 after the shrunk portion 210 is inserted in the grip bar hole 200, so as to prevent the grip bar 21 from whirling. And with the portion of the shrunk portion 210 extended outside the grip bar hole 200 riveted with the wing 20, the grip bar 21 is completely combined with one end of the wings 20. The connecting bar holes 203 and 204 are respectively to be inserted and riveted with the first connecting bar 22 and the second connecting bar 23, as shown in FIGS. 4 and 5. The second connecting bar 23 is further provided with an elastic device groove 230 bored around the center for being hooked by one end of an elastic device 242, and plural shrunk portions 231 consecutively formed at two ends respectively with different diameters.

As shown in FIGS. 1~3, installed between the wings 20 is an actuating plate 24, which is provided with a guiding portion 240a extended outward at two sides respectively for being fitted in the lengthy hole 202 of the wings 20 to limit the actuating plate 24 to a certain displacement while being incited to move. An extension 240 is further extended outward from the guiding portion 240a, employed to fit in a curved lengthy hole 250 of a driven plate 25 after being inserted through the lengthy hole 202 of the wings 20 so as to compel the driven plate 25 to work after being driven by the actuating plate 24. The actuating plate 24 is further provided with an elastic device base 241 shaped slightly oblique for being hooked by another end of the elastic device 242, and a grabbing portion 243 grabbed by fingers to operate the actuating plate 24 moving to and fro in the lengthy holes 202 of the wings 20, as shown in FIGS. 4~9.

As shown in FIGS. 1-3, the two driven plates 25 are installed outside the wings 20, shaped irregular. Each driven plate 25 is bored with a curved lengthy hole 250 fitted with the extension 240 of the actuating plate 24. As the actuating plate 24 is forced to move, the extension 240 is to simultaneously move in the curved lengthy hole 250 enabling the driven plate 25 to deflect in accordance to the track of the curved lengthy hole 250. Each driven plate 25 is further provided with a connecting bar hole 251 bored above the curved lengthy hole 250 for being inserted by and combined with the second connecting bar 23. As described previously, with the second bar 23 used as a central fulcrum, each driven plate 25 can deflect in accordance to the track of the curved lengthy hole 250 while the actuating plate 24 is forced to move. The driven plate 25 further has one end formed as a latch 252 shaped with a certain curve to collaborate with the hook 205 of the wings 20 to lock two ends of the winding shaft 14. While the shrunk portions 231 of the second connecting bar 23 are inserted through the connecting bar hole 204 of the wings 20 and the connecting bar hole 251 of the driven plate 25, a first washer 232 is fitted between the wing 20 and the driven plate 25, and a second washer 233 is fitted outside the driven plate 25. The second connecting bar 23 is then riveted with the wings 20. As the actuating plate 24 is pulled by a user toward himself, the extension 240 can be drawn to shift in the curved lengthy hole 250 of the driven plate 25 to make the driven plate 25 deflecting in accordance to the track of the curved lengthy hole 250, as shown in FIGS. 4 and 5, thus the driving member 2 can be separated from or assembled with the fixing member 1.

Figure 7:
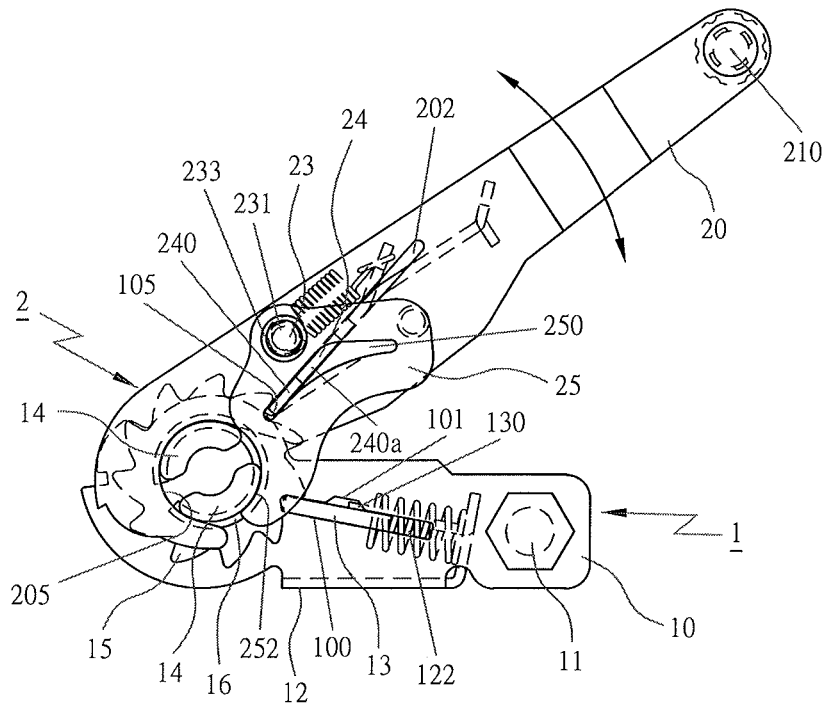
FIG. 7 is a side view of the preferred embodiment of a cargo bracing device in the present invention, showing a first state of collaboration between the driving member and the fixing member.
Figure 8:
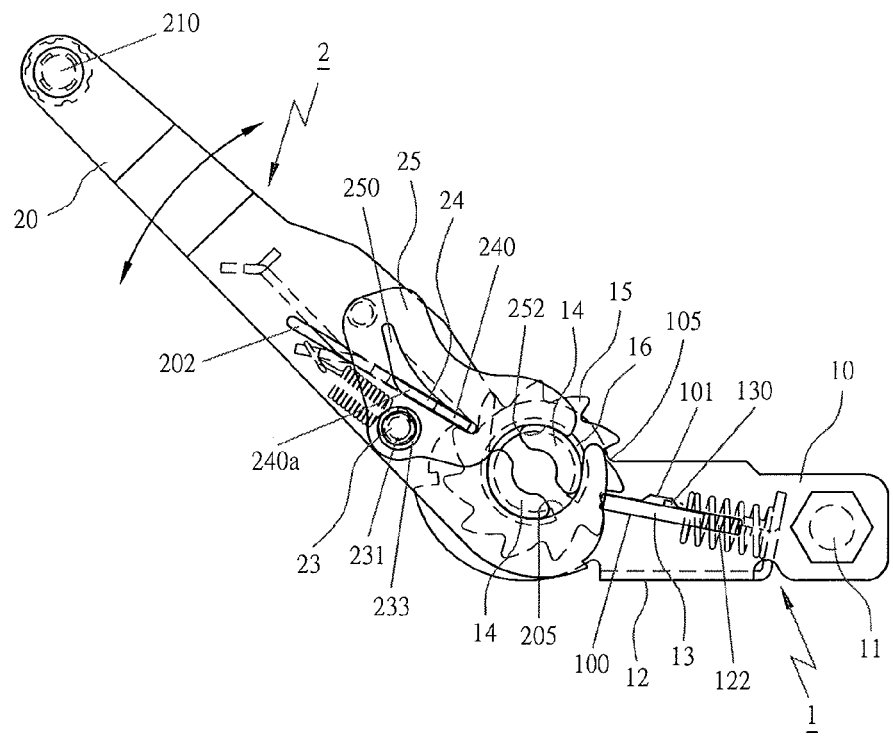
FIG. 8 is a side view of the preferred embodiment of a cargo bracing device in the present invention, showing a second state of collaboration between the driving member and the fixing member.

As shown in FIGS. 3 and 6~8, when a cargo is to be tightened with the present cargo bracing device, a user has first to make the driving member 2 combined with the fixing member 1 in a closed state, as shown in FIG. 6. Next, as shown in FIG. 7, the actuating plate 24 of the driving member 2 can be pulled outward to enable the ratchets 15 outside the winding shaft 14 to whirl with a certain track, with the driving member 2 and the fixing member 1 opened with a certain angle. Then the actuating plate 24 has to be pulled off the ratchets 15, and the driving member 2 is reversely moved back to the position as shown in FIG. 6. With the process mentioned above, the winding shaft 14 can thus be rotated to wind a rope repeatedly.

As shown in FIGS. 4 and 9, after winding the rope to a certain extent, the actuating plate 24 of the driving member 2 can be widely operated to drive the driven plate 25 making a certain deflection as shown in FIGS. 4 and 5, with the latches 252 of the driven plates 25 and the hooks 205 of the wings 20 widely opened with an interior diameter larger than the exterior diameter of the winding shaft 14. By the time, the driving member 2 can be removed from the fixing member 1, keeping the rope unable to be altered by anyone without the driving member 2, assuring cargoes fixedly fastened to secure delivery.

Owing to components of the cargo bracing device designed simply and combined by riveting, a maker can produce the device by automatic equipments, with structural stability and usage security upgraded.

While the preferred embodiment of the invention has been described above, it will be recognized and understood that various modifications may be made therein and the appended claims are intended to cover all such modifications that may fall within the spirit and scope of the invention.

What is claimed is:

1. A cargo bracing device comprising:
    a fixing member provided with two side plates integrally made with a connecting plate provided with an elastic device base for being fitted with one end of an elastic device, said side plates respectively provided with a hole bored in one end for being inserted by a bolt to connect with each other, a winding shaft hole bored in another end of said side plates respectively for a winding shaft made of two semi-annular steels to pass through, two ratchets respectively fitted on two ends of said winding shaft outside said side plates and provided with two semi-annular holes for being correspondingly inserted by said semi-annular steels of said winding shaft, a C-shaped fixer locked around two ends of said winding shaft outside said ratchets respectively to make said ratchets position said side plates respectively bored with a lengthy hole for two ends of a locking plate to pass through, said winding shaft able to rotate under operating said locking plate in association with said ratchets, said locking plate further provided with an elastic device base to engage with another end of said elastic device so as to provide dynamic force for restoring said locking plate; and
    a driving member provided with two wings having one end riveted with a grip bar, a first connecting bar and a second connecting bar further riveted with said wings to strengthen them, said wings respectively provided with a sloped lengthy hole for fitting two guiding portions of an actuating plate respectively, an extension extended outward of each said guiding portion to pass through a curved lengthy hole bored in two driven plates respectively, said driven plates respectively provided with a connecting bar hole for said second connecting bar to pass through, said second connecting bar employed as a fulcrum for deflection of said driven plates, said wings respectively having another end formed as a hook collaborating with a latch of said driven plates respectively to lock on two ends of said winding shaft, said guiding portions of said actuating plate able to move in said lengthy holes of said wings and said extensions of said actuating plate able to move in said curved lengthy holes of said driven plates while operating said actuating plate so that said actuating plate is to deflect with a certain track with said second connecting bar as a fulcrum and said hooks of said wings and said latches of said driven plates are to open wide to make said driving member separable from said fixing member.

2. The cargo bracing device as claimed in claim 1, wherein each of said lengthy holes of side plates of said fixing member is cut with a projected groove used to work with two blocking projections of said locking plate respectively, said locking plate first inserted from outside of one said lengthy hole of one said side plate to extend out of another said lengthy hole of another said side plate with said blocking projections of said locking plate corresponding to said projected grooves of said side plates and removing said blocking projections off said projected grooves to make said locking plate locked with said side plates.

3. The cargo bracing device as claimed in claim 1, wherein said connecting plate of said fixing plate is provided with an upward curved end formed with said elastic device base for being fitted with one end of said elastic device of said fixing member so as to simplify assembly of said elastic device.

4. The cargo bracing device as claimed in claim 1, wherein said locking plate is provided with said elastic device base to engage with said another end of said elastic device so that said elastic device is fitted between said connecting plate and said locking plate to provide dynamic force for restoring said locking plate.

5. The cargo bracing device as claimed in claim 1, wherein said wings of said driving member are respectively provided with a grip bar hole having a plurality of projections spotted on an inner circumference, said grip bar provided with two shrunk portions formed at two ends, each said shrunk portion spotted with plural projections around a circumference to alternately interlock with said projections of said grip bar hole after inserting said shrunk portion in said respective grip bar hole so as to prevent said grip bar from whirling, said grip bar thus being completely combined with one end of said wings by riveting a portion of said shrunk portions extended outside respective ones of said grip bar hole with the wings.

6. The cargo bracing device as claimed in claim 1, wherein said wings of said driving member are respectively provided with said sloped lengthy hole, two connecting bar holes bored in each said wing above and below said sloped lengthy hole respectively for being riveted with said first connecting bar and said second connecting bar.

7. The cargo bracing device as claimed in claim 1, wherein said second connecting bar is provided with an elastic device groove for being locked by one end of an elastic device of said actuating plate.

8. The cargo bracing device as claimed in claim 1, wherein said actuating plate of said driving member is provided with an elastic device base shaped slightly oblique for being hooked by an end of an elastic device of said actuating plate.

9. The cargo bracing device as claimed in claim 1, wherein said driven plates of said driving member are shaped irregular and respectively provided with said connecting bar hole, said second connecting bar having two ends respectively formed with plural shrunk portions successively inserted through said connecting bar hole of a respective said wing and said connecting bar hole of said driven plate, a first washer fitted between said wing and the driven plate and a second washer fitted outside said driven plate, two ends of said second connecting bar then riveted to make said wings and said driven plate and said second connecting bar combine together so that said driven plate can deflect in a certain track with said second connecting bar working as a fulcrum.

* * * * *